United States Patent [19]

Hesthamar et al.

[11] Patent Number: 5,343,759
[45] Date of Patent: Sep. 6, 1994

[54] SENSOR SYSTEM

[75] Inventors: Tore Hesthamar; Fredrik Althoff, both of Mölndal; Thomas Larsson, Västra Frölanda, all of Sweden; Bram Veenhuizen, IJsselstein, Netherlands

[73] Assignee: SKF Nova AB, Gothenburg, Sweden

[21] Appl. No.: 905,374

[22] Filed: Jun. 29, 1992

[30] Foreign Application Priority Data

Jul. 8, 1991 [SE] Sweden ................................ 9102121

[51] Int. Cl.$^5$ .............................................. G01L 1/00
[52] U.S. Cl. .................... 73/761; 73/862.69; 73/DIG. 2
[58] Field of Search ............ 73/862.333, 862.336, 73/761, DIG. 2, 862.69

[56] References Cited

U.S. PATENT DOCUMENTS

| 3,969,810 | 7/1976 | Pagano | 73/581 |
|---|---|---|---|
| 4,106,370 | 8/1978 | Kraus et al. | 73/761 |
| 4,279,163 | 7/1981 | Takekoshi et al. | 73/761 |
| 4,760,745 | 8/1988 | Garshelis | 73/862.334 |
| 4,823,620 | 4/1989 | Edo et al. | 73/862.36 |
| 4,986,137 | 1/1991 | Sato et al. | 73/862.36 |
| 5,142,919 | 9/1992 | Satoh et al. | 73/862.333 |
| 5,154,084 | 10/1992 | Sonderegger et al. | 73/761 |
| 5,280,725 | 1/1994 | Stengel | 73/761 |

FOREIGN PATENT DOCUMENTS

| 0067974 | 12/1982 | European Pat. Off. . |
|---|---|---|
| 0422702 | 4/1991 | European Pat. Off. . |
| 3819083 | 12/1989 | Fed. Rep. of Germany . |
| 3940220 | 6/1990 | Fed. Rep. of Germany . |
| 59-151030 | 8/1984 | Japan . |
| 61-245033 | 10/1986 | Japan . |
| 62-203032 | 9/1987 | Japan . |
| 63-33634 | 2/1988 | Japan . |
| 2187557 | 9/1987 | United Kingdom . |

*Primary Examiner*—Richard E. Chilcot, Jr.
*Assistant Examiner*—R. Biegel
*Attorney, Agent, or Firm*—Burns, Doane, Swecker & Mathis

[57] ABSTRACT

The invention relates to a sensor system for measuring e.g. the preloads in screws, bolts or similar. It comprises sensor means (2) comprising a magnetoelastic material (6) sensitive to the preloads to which the object is exposed and a sensing device (3) comprising a contact portion (4) and gripping portion (5). The contact portion is so arranged that it at least partly surrounds the sensor means (2) and the magnetoelastic material (6) is excited with an excitation frequency of at least 300 kHz.

17 Claims, 5 Drawing Sheets

SENSOR SYSTEM

TECHNICAL FIELD

The present invention relates to a sensor system for measuring for example the preload in screws, belts or similar elements comprising sensor means, said sensor means comprising a magnetoelastic material sensitive to the loads to which the object is exposed, said magnetoelastic material being excited with an excitation frequency, a sensing device for sensing the permeability changes in the magnetoelastic material, said sensing device comprising a contact portion and a gripping portion.

A sensor system of this kind is primarily intended to be used for measuring of the preload in screws and bolts as well for installation purposes as for check-up's and service purposes, particularly, as to the mounting of so called slewing rings, i.e. bearings with a large diameter and comparatively thin sections, a large number of screws/bolts are needed. In this case, as in several other applications, it is of the outmost importance to have a sensor system which is reliable and easy to mount and to handle, and as far as possible insensitive to stray fields and disturbances.

TECHNICAL BACKGROUND

Sensor systems for measuring of preloads are already known. In a known system the sensitive material comprises strain gauges being attached to and molded onto the sensor means along the periphery thereof. One of the drawbacks with said known system consists in the indispensability of the electrical connections which easily can be damaged since they are extremely thin and sensitive, exposed to humidity, dirt and so on, and further the extremely small voltages involved which causes the sensitivity to disturbances to be rather large.

Therefore, and because of high manufacturing costs those systems can only be very sparsely used outside e.g. laboratories. It is furthermore known to use piezoceramic/resistive gauges as a sensitive material but also they have not found a wide use mainly due to high manufacturing costs and to the necessity of external electrical connections. Presently there is not known any simple way to measure the preloads in screws/bolts. Today screws/bolts are normally preloaded via a so called hydrocam. Consequently, in order to control, adjust and so on there does not exist any other possibility than to either mount the hydrocam and preload the screw every time or to use ultrasonic techniques which also has evident drawbacks due to high manufacturing costs and difficult and time-consuming mounting.

In U.S. Pat. No. 4,882,936 a magnetoelastic torque tool is disclosed which is used for applying torque to a fastener and via a magnetoelastic torque transducer continuously sensing the torque being applied. The torque is applied e.g. via a screw driver, the torque in which is sensed in the screwdriver shaft opposite to the screwdriver bit. This sensor thus senses the torque in the tool which applies the torque to an object and thus cannot be used for the same purposes and in the same way as the present invention.

Furthermore, it is complicated and sensitive to stray fields. There is also no mention of the magnitude of the excitation frequency, which in all known devices lies around 20-30 kHz, or at the most up to 100 kHz.

U.S. Pat. No. 4,114,428 shows a strain-stress detecting system which however is based on a principle far from the one as disclosed in the present invention, in that it is a radio-frequency tuned-circuit microdisplacement transducer.

Consequently there has been a long-felt need to find a possibility so as to easily, in a fast and cheap way, measure the preload in screws/bolts. This is particularly important e.g. as for example so called slewing rings are concerned due both to the huge number of screw/bolts involved and to the importance of the screws being correctly preloaded, otherwise the endurance of the bearing can be severely reduced.

SUMMARY OF THE INVENTION

Accordingly, an object of the present invention is to provide a sensor system for sensing e.g. the preloads in screws, bolts or similar elements which is fast and easy to handle, is reliable, highly sensitive to the strains and stresses in the object at the same time as it is insensitive to stray fields and temperature.

A further object of the invention is to provide a sensor system which is easy and cheap to manufacture and which has a high capability of withstanding dirt, grease and so on.

Preferably the excitation frequency is between 500 kHz to 10 MHz and more particularly in the range of 1-2 MHz.

According to a preferable embodiment the magnetoelastical material comprises a magnetostrictive amorphous material. The material can furthermore be applied essentially axially on the sensor means, and even more particular it can be comprised by magnetoelastic ribbons, said ribbons being attached to the sensor means and forming a ribbon belt. Conveniently the sensor means comprises a washer. According to the invention it is also convenient that the contact portion comprises a so called snap-on unit.

In a preferred embodiment the contact portion comprises a coil system, said system partly or completely, preferably axially, enclosing the sensor means. More specifically the coil system at least comprises a coil bobbin, a bobbin-holder and a pick-up-coil.

Alternatively the bobbin system may comprise a separate excitation coil.

In the copending patent application Ser. No. 07/905,365 named "Sensor and method for measuring torque and/or axial stresses" the functioning of and an attempt to a more complete explanation of the phenomena of high excitation frequencies used in amorphous sensors is disclosed, the subject-matter of said application hereby being incorporated as an explanatory part of the present invention. The copending patent application Ser. No. 07/905,366 "Surveillance system" refers to a (fixedly) mounted system for a more or less continuous survey of preloads.

The temperature can in a number of ways influence the sensor system. When the sensor means is not preloaded, i.e. the sensitive material, which can be in the form of magnetoelastic ribbons, is not exposed to any strain, the variations in temperature give rise to a so called zero-offset signal. If e.g. the ribbons and the sensor means have different temperature coefficients this signal may vary. In this way the sensor means can cause the ribbons to get stressed due to the difference in temperature coefficients. Even an adhesive substance or similar through which the ribbons are attached to the sensor means, might have a similar effect to some extent.

Furthermore, the sensitivity of the ribbons to a given stress may vary with the temperature (sensitivity-offset).

The effects of the temperature as referred to above can be controlled and compensated for by the sensing device being provided with a first temperature sensing and a first temperature compensation means for measuring and compensating for the temperature of the sensor means and the sensitive material.

Preferably the sensing device also comprises second temperature sensing means and second temperature compensating means for measuring and compensating for the temperature of the gripping portion. This serves the purpose to compensate for drifting of the temperature in the electronics of the gripping portions and to make the system reliable e.g. upon removal from a warmer to a colder environment or vice versa.

According to a particular embodiment the sensor means comprises a washer and a nut, said washer and nut forming a single unit.

It has also appeared to be appropriate that the sensor means comprises a non-magnetic, non-conductive protection layer for protection of the sensitive material. Depending on application, economy and so forth the sensor system can be formed so that the gripping portion either comprises a unit for processing and presentation of the result of the measurement or it can be connected to an external unit for processing and presentation of the result of the measurement.

BRIEF DESCRIPTION OF THE DRAWINGS

Embodiments of the invention will hereinafter be more fully described with reference to the accompanying drawings, wherein.

DESCRIPTION OF PREFERRED EMBODIMENTS

Figures 1A, 1B:
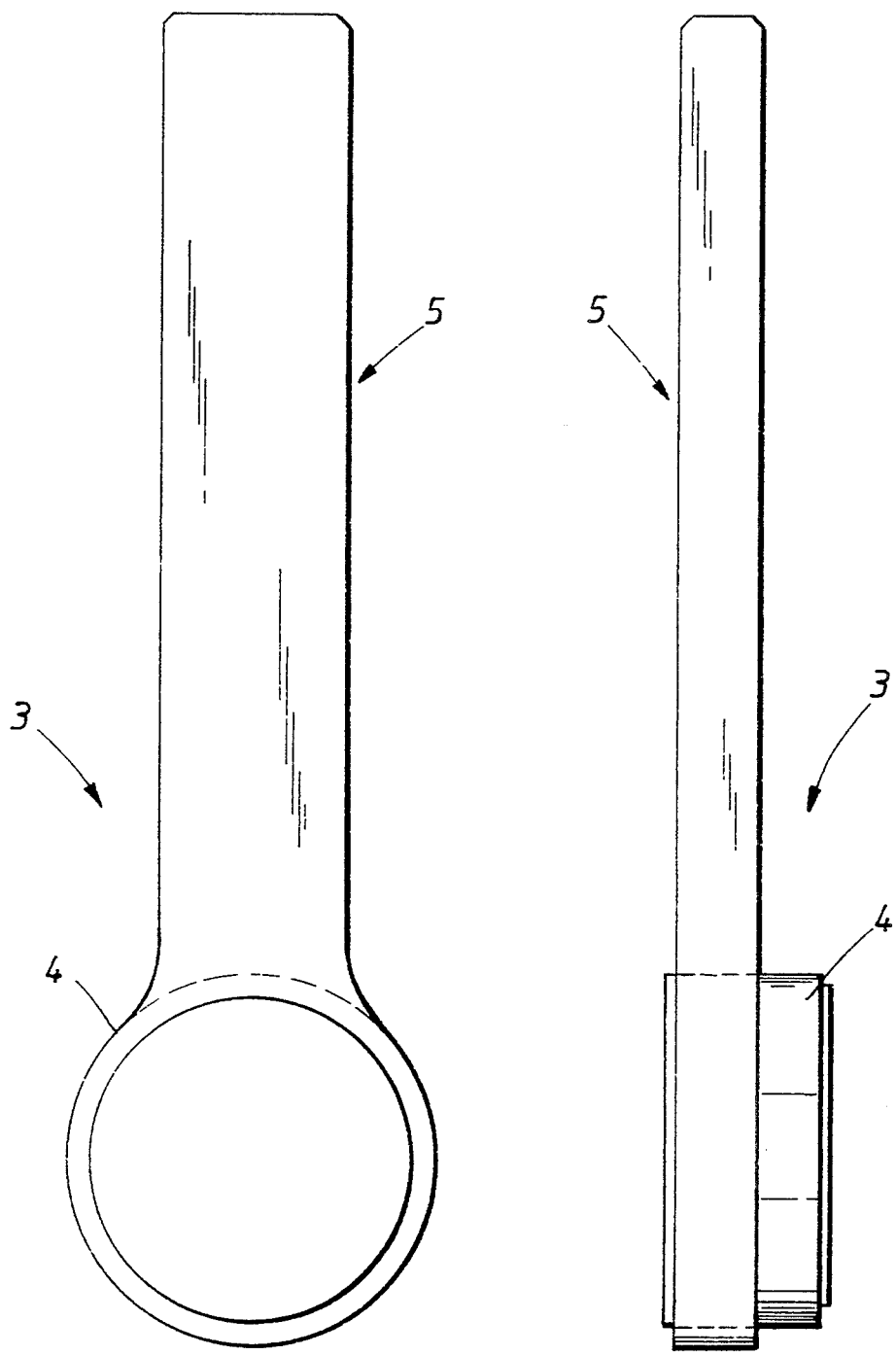
FIG. 1a is a plan view of a sensing device comprising a contact portion and gripping portion.
FIG. 1b is a side view of a sensing device comprising a contact portion and a gripping portion.
Figure 2:
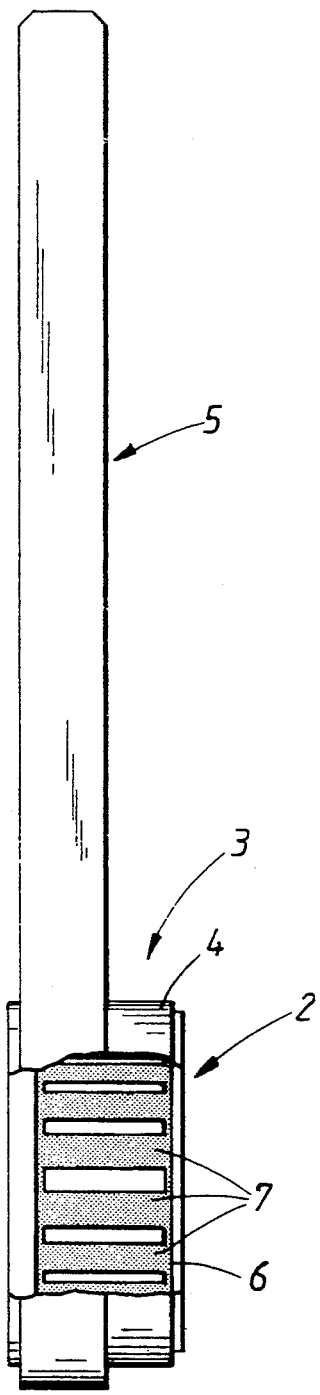
FIG. 2 is a schematical view of a sensing device as arranged on a sensor means.
Figure 3:
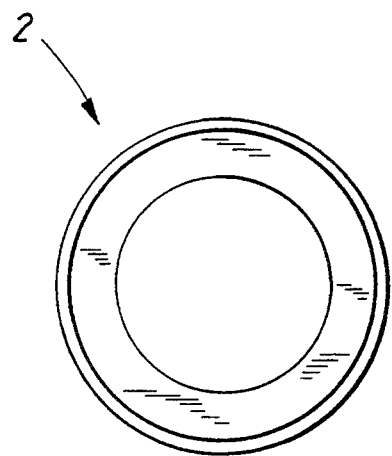
FIG. 3 is a plan view of a sensor means in the form of a washer.
Figure 4:
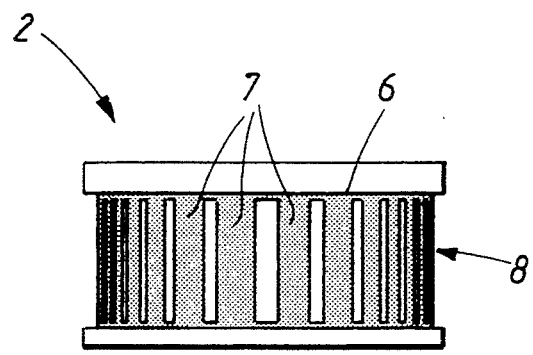
FIG. 4 is a side view of a sensor means in the form of a washer with magnetoelastic ribbons attached thereto.

The sensor system according to the in FIGS. 1-4 illustrated embodiment comprises a sensing device 3, said sensing device comprising a contact portion 4 and a gripping portion 5 securely attached to each other, and a sensor 2 in the form of a washer. The sensor 2, which is intended to be on a screw 23 and after which a nut or similar element is threaded on to the same screw, is made of steel and it comprises magnetoelastic ribbons 7 attached to it axially in such a way so as to form a so called ribbon belt 8 which encompasses the sensor means 2 or the washer. The magnetoelastic ribbons 7 are made from a wide amorphous ribbon through etching. The axis sensitive to strain is parallel with the ribbons as their length to a greater extent exceeds the width.

Figure 7:
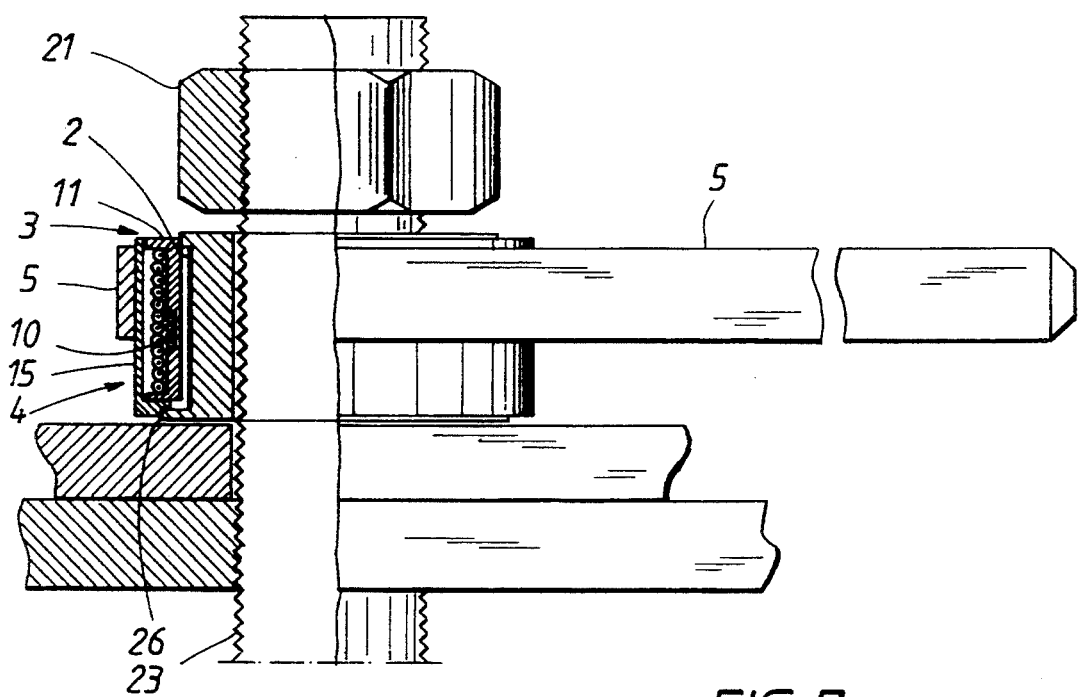
FIG. 7 is a sensor system.

The washer 2 is provided with a protruding edge or rim 26 on one of its sides (see FIG. 7), the outer diameter of said edge or rim 26 somewhat exceeding the diameter of the washer (sensor means 2) on its other side so that upon measuring the contact portion 4 will contact the protruding edge 26.

The contact portion 4 is formed as a so called snap-on-unit which is threaded and snapped on to the washer. The contact portion 4 further comprises a coil bobbin holder 15 with coil-bobbins 11 around which are winded both an excitation coil and a pick-up-coil 10. The preload to which the screw is exerted gives rise to a certain extension of the washer (sensor means 2) wherethrough the magnetoelastic ribbons 7 are caused to be extended and compressed. As a consequence thereof the magnetic properties of the material 6 are affected. If an electric current of a high frequency (at least 300 kHz) as explained in the patent application Ser. No. 07/905,365 "Sensor and method of measuring torque and/or axial stresses" is sent through the excitation coil through the use of a wave generator generating any wave form, but preferably sine waves, a magnetic field is created and due to the mutual inductance between the excitation coil and the pick-up-coil 10 a voltage is induced in the pick-up-coil 10. According to a particular embodiment one common coil could be used for both the excitation and the pick-up function. A particularly convenient excitation frequency has shown to be approximately 1-2 MHz.

As further explained in the abovementioned patent application, the excitation frequency (and the excitation level) should be such that the magnetization would be in the region where small angle magnetization rotation dominates over domain wall motion.

Figure 8:
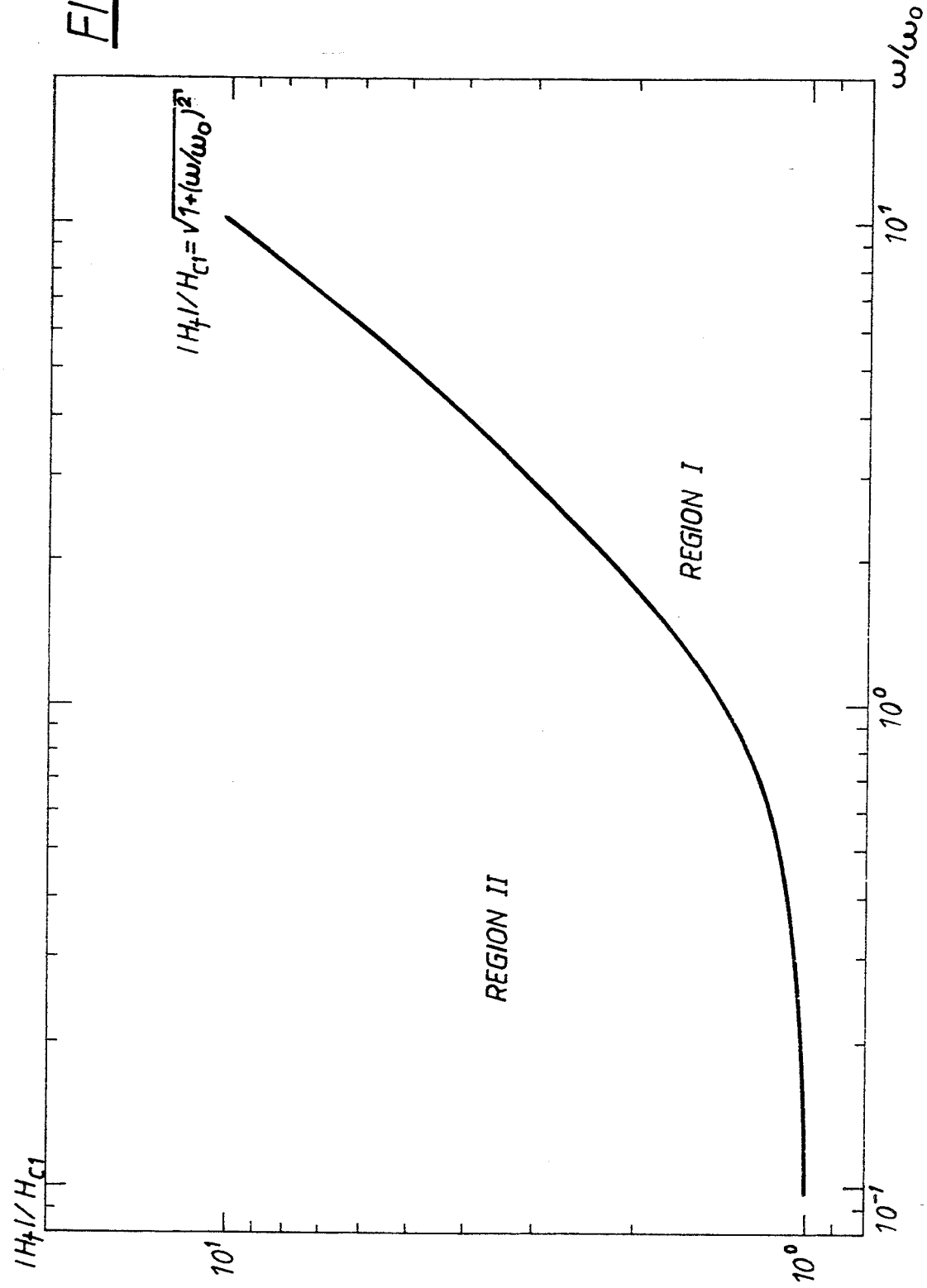
FIG. 8 is an illustration of regions of different magnetization processes.

An illustration of this is shown in FIG. 8 where region I is the region in which magnetization due to domain wall motion dominates whereas in region II magnetization due to small angle magnetization rotation dominates, i.e. the excitation frequency (and the excitation level) has to be chosen such that it falls within the region I).

Since the magnetoelastic ribbons 7 get the function of a core of the pick-up-coil 10, the coupling factor (which depends on the number of windings of the coils, the distance between the coils and the magnetic properties of the core) will be dependant on the preload on the screw or similar 23.

Since the ribbons 7 are bonded on to the washer in the direction of the axis of the principal strain, e.g. axially, maximum sensitivity is obtained.

If the ribbons 7 are attached in a way so as to make an angle with the direction of the principal strain, the sensitivity will decrease. On the other hand the sensor system will be able to indicate torque and force.

The contact portion 4 (the snap-on-unit) preferably comprises first temperature sensing means which upon measuring have to be in thermal contact with the washer 2. A first temperature compensating means compensates for temperature. The temperature sensing means comprises a small, spring-loaded element which is sensitive for temperature. It can be constituted by a standard temperature detector, a Resistive Temperature Detector, a so called NTC-resistance or a Pt 100-element or a similar device which is placed in a turned out groove or an indent at the periphery of the coil bobbin.

The temperature compensation can be carried out in different ways e.g. via feedback loops.

Further reference to temperature compensation is done in the copending patent application Ser. No. 07/905,366 "Surveillance system" where a number of sensor systems are concerned. However, the same principle applies to a single system.

Figure 5:
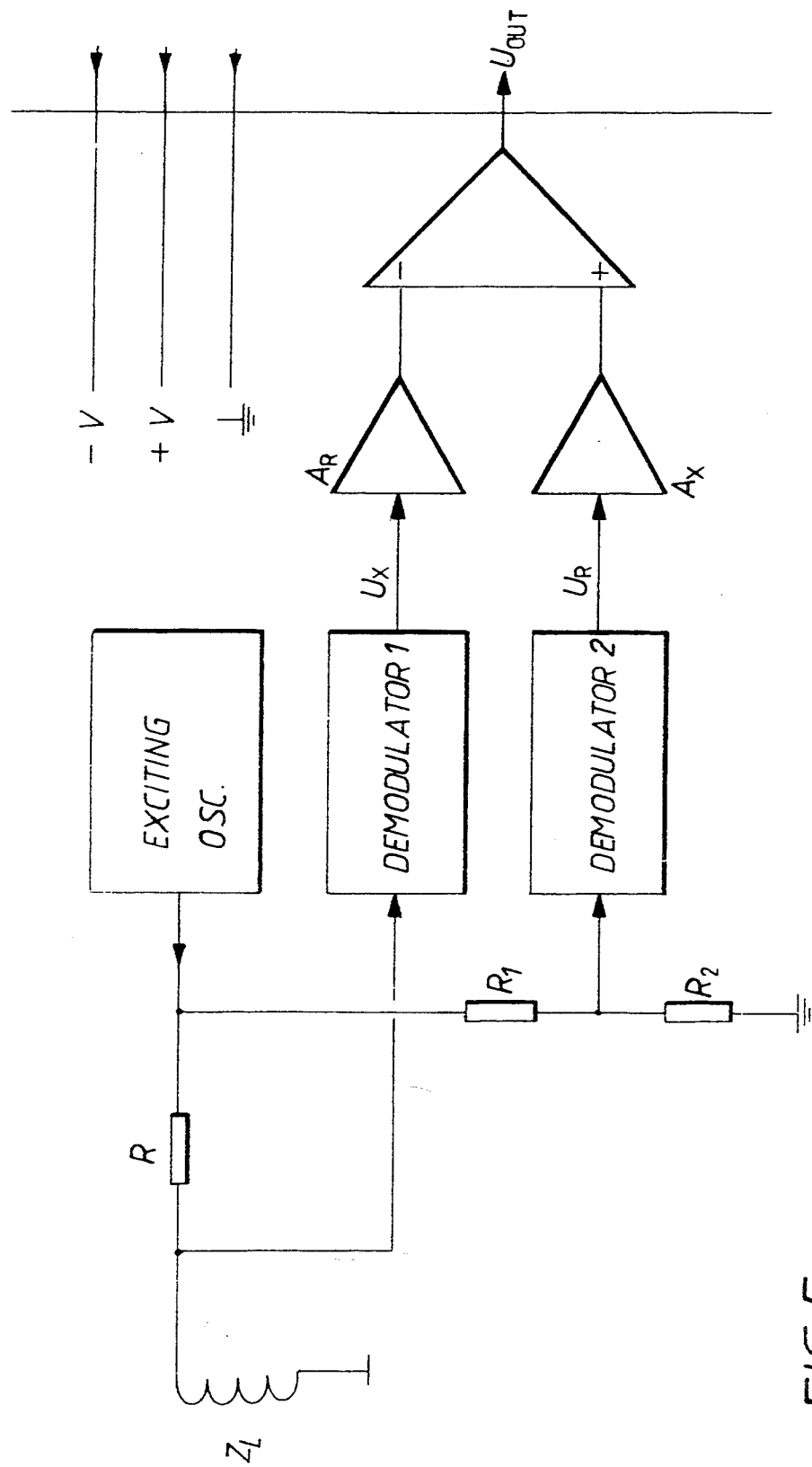
FIG. 5 illustrates demodulating and exciting electronics comprised by the sensor system.

In FIG. 5 demodulator 1 serves to demodulate the sensor signal whereas demodulator 2 is a temperature compensation demodulator. Electrically the sensor means behaves like an impedance, $Z_L$, which varies with the load applied to the washer or similar.

According to one embodiment the sensor means is connected as a voltage divider together with a resistor, R, said voltage divider being fed by an oscillator.

The resistor R is chosen to be sufficiently large (e.g. $R > |Z_L|$) to make the output voltage vary linearly with $Z_L$. This resistor R further keeps the excitation current independent of $Z_L$ and of the load applied to the washer. The output from the voltage divider is an AC-voltage and this voltage is converted to a DC-signal ($U_x$) by means of a diode detector. The signal, $U_x$, varies with temperature, approximately 2,5 mV/° C. This effect is caused by the variations of the voltage drop over the diode and the temperature dependence of the washer itself. It is assumed that the washer and the diode are kept at the same temperature.

If a further, identical, diode detector is introduced which converts a stable sinusoidal signal $U_R$ independent of the washer, this signal $U_R$ will only comprise the temperature dependence of the diode, approximately 2 mV/° C. If the signals, $U_x$ and $U_R$, are passed on to two amplifiers with different gains for the two input signals $U_x$ and $U_R$ respectively and then further passed on to a differential amplifier., the temperature dependence of the two signals will be cancelled. The output signal $U_{out}$ from the washer (sensor means) should then read:

$$U_{out} = A_R \cdot U_R - A_X \cdot U_X.$$

According to one embodiment $A_R$ is chosen to 2,5 and $A_X$ to 2 which results in a balanced temperature drift.

$A_R$ and $A_X$ may vary from one sensor system to another within the surveillance system.

Preferably a Ni-based amorphous material having an temperature coefficient approximately equal to that for steel is used for the sensor means for keeping the temperature dependence reasonably low.

The demodulating electronics might e.g. be comprised by the gripping portion or the contact portion.

Through variations of the excitation current due to drift in the oscillator or similar the signal from the pick-up-coil 10 is affected. This may be compensated for through measuring of the excitation current and a feedback circuit which goes directly to the oscillator (function generator) which then can feed the coil with a constant current.

According to another embodiment all the compensating signals can be fed to an AD-converter and a computer can be used for so called numerical compensation.

In order to compensate for external temperature and for the temperature difference between sensing device 3 and the washer 2 the gripping portion 5 further may comprise a second temperature sensing means and second temperature compensating means. Also this temperature can be measured by e.g. an ordinary Resistive Temperature Detector and the compensation can be carried out in a number of ways e.g. either via analogue compensation or via the AD-converter for numerical compensation in a micro-processor. If all compensations are done in an analogue way the analogue voltage will be proportional to the force. The AD-converter and the $\mu$-processor would then not be needed.

As a protection for the amorphous material attached to the sensor 2; 20 a plastic layer can be used. The shown washer is circular and is comparatively thick. The washer (or sensor means 2) is however not necessarily circular but this depends on the application. For example it can be square shaped when applied to bearing brackets. Normally hardened steel is used but for particular purposes e.g. a titanium alloy could be used (in case the preload is very low). The tensile properties of such an alloy are very high and the response signal will be considerably higher due to a low module of elasticity.

In order to make it possible to use the same sensing device 3 for differently sized sensor means 2; 20 exchangeable coil-bobbin holders can be used. It is furthermore possible for reasons of accessibility to make the coil system/sensing device openable e.g. like a pair of tongs or similar.

According to a further embodiment the sensor means 2; 20 and the coil system can be formed in such a way so as to enable measurement of the extension in different sections of the sensor means. Therethrough it is possible to determine the bending moment and the shear stresses acting on the point.

To enable this kind of measurements the coil can e.g. be so formed that for example only 25% of the coil covers the sensitive material 6 radially. Then the sensing device 3 can be rotated via the gripping portion 5 in order to measure in different sectors.

Figure 6:
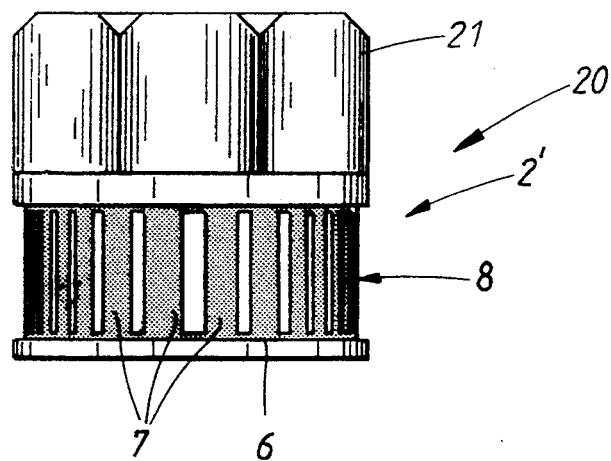
FIG. 6 is a side view of a washer and a nut as a combined unit.

In FIG. 6 a different sensor means 20 is shown which comprises a washer 2' and a nut 21, said washer 2' and nut 21 forming one single unit.

It is evident to those skilled in the art that the invention is not limited to the described embodiments but can be varied and modified in a number of ways without departing from the scope of the claims. E.g. for long term measurements a simplified contact portion could be used. Accordingly a computerized gripping portion could be used or the same could be connected to either stationary or portable computer facilities.

We claim:

1. A sensor system for measuring stress on a bolt having a nut, comprising:
   a sensor comprised of a magnetoelastic material;
   a sensing device comprising a contact portion for at least partly surrounding said sensor, and a gripping portion extending from said contact portion;
   wherein said sensor is positioned between an object being fastened and said nut such that said sensor senses compressive forces created between said nut and said object; and
   an electronic system connected to said sensing device for monitoring loads sensed by said sensor.

2. The system of claim 1, wherein said sensing device is not electrically connected to said sensor.

3. The system of claim 1, wherein said sensing device is set so as to excite said sensor predominantly by a small angle magnetization rotation process.

4. The system of claim 1, wherein said sensor is compressed between said nut and said object when a load is placed on said object by said nut.

5. The system of claim 1, wherein said sensor is annular and surrounds said bolt.

6. The system of claim 1, wherein said magnetoelastic material is excited with a frequency of at least 300 kHz.

7. The surveillance system of claim 1, wherein said magnetoelastic material is excited with a frequency between 500 kHz and 10 MHz.

8. The system of claim 1, wherein said magnetoelastic material is a magnetoelastic amorphous material.

9. The system of claim 1, wherein said magnetoelastic material is applied axially on said sensor.

10. The system of claim 1, wherein said magnetoelastic material comprises magnetoelastic ribbons in the form of a ribbon belt.

11. The system of claim 1, wherein said sensor comprises a washer.

12. The system of claim 1, wherein said coil system completely encloses said sensor.

13. The system of claim 1, wherein said coil system comprises coils for carrying out both an excitation function and a pick-up function.

14. The system of claim 1, wherein said sensing device includes temperature sensing means and temperature compensation means.

15. The surveillance system of claim 13, wherein said temperature sensing means includes a conventional Resistance Temperature Detector attached to the fastener and the temperature compensation means includes an electric feedback loop.

16. The system of claim 1, wherein said sensor comprises a nonmagnetic, nonelectrically conductive protection layer for protecting the magnetoelastic material.

17. The system of claim 1, wherein said system includes a plurality of sensors and sensing devices and the electronic system includes means for observing each sensor separately.

* * * * *